United States Patent
Suzuki et al.

[11] Patent Number: 6,062,641
[45] Date of Patent: May 16, 2000

[54] SEAT APPARATUS WITH AIR FLOW

[75] Inventors: Seiji Suzuki; Hidetoshi Nakane; Masato Itakura; Toshihiro Inayoshi, all of Toyota, Japan

[73] Assignee: Aisin Seiki Kabushiki Kaisha, Kariya, Japan

[21] Appl. No.: 09/188,152

[22] Filed: Nov. 10, 1998

[30] Foreign Application Priority Data

Nov. 10, 1997 [JP] Japan ..................................... 9-307520

[51] Int. Cl.⁷ .................................................. A47C 7/72
[52] U.S. Cl. .................................. 297/180.1; 297/180.14
[58] Field of Search ................................... 454/120, 907; 297/180.1, 180.14

[56] References Cited

U.S. PATENT DOCUMENTS

| | | | |
|---|---|---|---|
| 2,782,834 | 2/1957 | Vigo | 297/180 |
| 2,826,244 | 3/1958 | Hurley | 297/452.47 |
| 3,550,523 | 12/1970 | Segal | 297/180 |
| 4,923,248 | 5/1990 | Feher . | |
| 5,002,336 | 3/1991 | Feher | 297/180 |
| 5,403,065 | 4/1995 | Callerio | 297/180 |
| 5,524,439 | 6/1996 | Gallup et al. . | |
| 5,902,014 | 5/1999 | Dinkel et al. | 297/180 |
| 5,924,766 | 7/1999 | Esaki | 297/180 |
| 5,927,817 | 7/1999 | Ekman et al. | 297/452.47 |

FOREIGN PATENT DOCUMENTS

| | | | |
|---|---|---|---|
| 191212 | 8/1987 | Japan | 454/120 |
| 3-151912 | 6/1991 | Japan . | |

*Primary Examiner*—Harold Joyce
*Assistant Examiner*—Derek S. Boles
*Attorney, Agent, or Firm*—Burns, Doane, Swecker & Mathis, LLP

[57] ABSTRACT

A seat apparatus includes a seat cushion, a seat back associated with the seat cushion, an air vent extending from the bottom side of the cushion towards the sitting side of the cushion, and an air producing device which blows air, preferably temperature controlled air, to the air vent and to a groove facing the sitting side of the cushion. The seat apparatus is thus able to distribute air, preferably temperature controlled air, to the seated individual.

15 Claims, 3 Drawing Sheets

SEAT APPARATUS WITH AIR FLOW

FIELD OF THE INVENTION

This invention generally relates to a seat apparatus. More particularly, the present invention pertains to a seat apparatus for a vehicle or other use that is provided with an air flow producing mechanism.

BACKGROUND OF THE INVENTION

A known type of seat apparatus is disclosed in Japanese Patent Laid-Open Publication No. Hei 3-151912 published on Jun. 28, 1991. The disclosed seat apparatus includes a seat cushion and a seat back, each of which is provided with a spring member which forms an area where temperature controlled air is introduced. In addition, metal meshes are set up on the spring member and an elastomer material is set up on the metal meshes.

This known type of seat apparatus suffers from the disadvantage that it is difficult to efficiently send the controlled air to selected desirable parts of the seat for the seated individual and so the seat apparatus is not as comfortable as it might otherwise be. In addition, this seat apparatus contains both spring members and metal meshes so that the seat apparatus has a complicated structure and is relatively expensive to produce.

In light of the foregoing, a need exists for a seat apparatus that is not susceptible to the same disadvantages and drawbacks as those discussed above.

It would thus be desirable to provide a seat apparatus that is comfortable to the user, not excessively complicated in construction and not excessively costly to manufacture.

SUMMARY OF THE INVENTION

According to one aspect of the invention, a seat apparatus for directing temperature controlled air to an individual seated on the seat apparatus includes a sitting portion contacted by an individual seated on the sitting portion, with the sitting portion including a filling member provided with at least one groove. A cover member covers the filling member, and an air vent is provided in the filler member that communicates with the groove. A temperature controlled air producing device produces temperature controlled air and directs the temperature controlled air into the air vent, with the temperature controlled air being directed through the air vent and into the groove to provide temperature controlled air to a seated individual in contact with the sitting portion.

According to another aspect of the invention, a seat apparatus for blowing air to an individual seated on the seat apparatus includes a sitting portion which is contacted by a seated individual, an air vent extending from the non-sitting side of the sitting portion towards the sitting side of the sitting portion, a groove connected to the air vent, and an air control device operatively connected to the air vent for blowing air into the air vent, with the air being directed from the air vent into the groove so that air is directed at the seated individual.

A further aspect of the invention involves a method of blowing temperature controlled air to an individual seated on a sitting portion of a seat apparatus. The method includes producing temperature controlled air, and distributing the temperature controlled air to selected portions of the sitting portion of the seat apparatus based on a pressure distribution of the individual sitting on the sitting portion of the seat apparatus.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
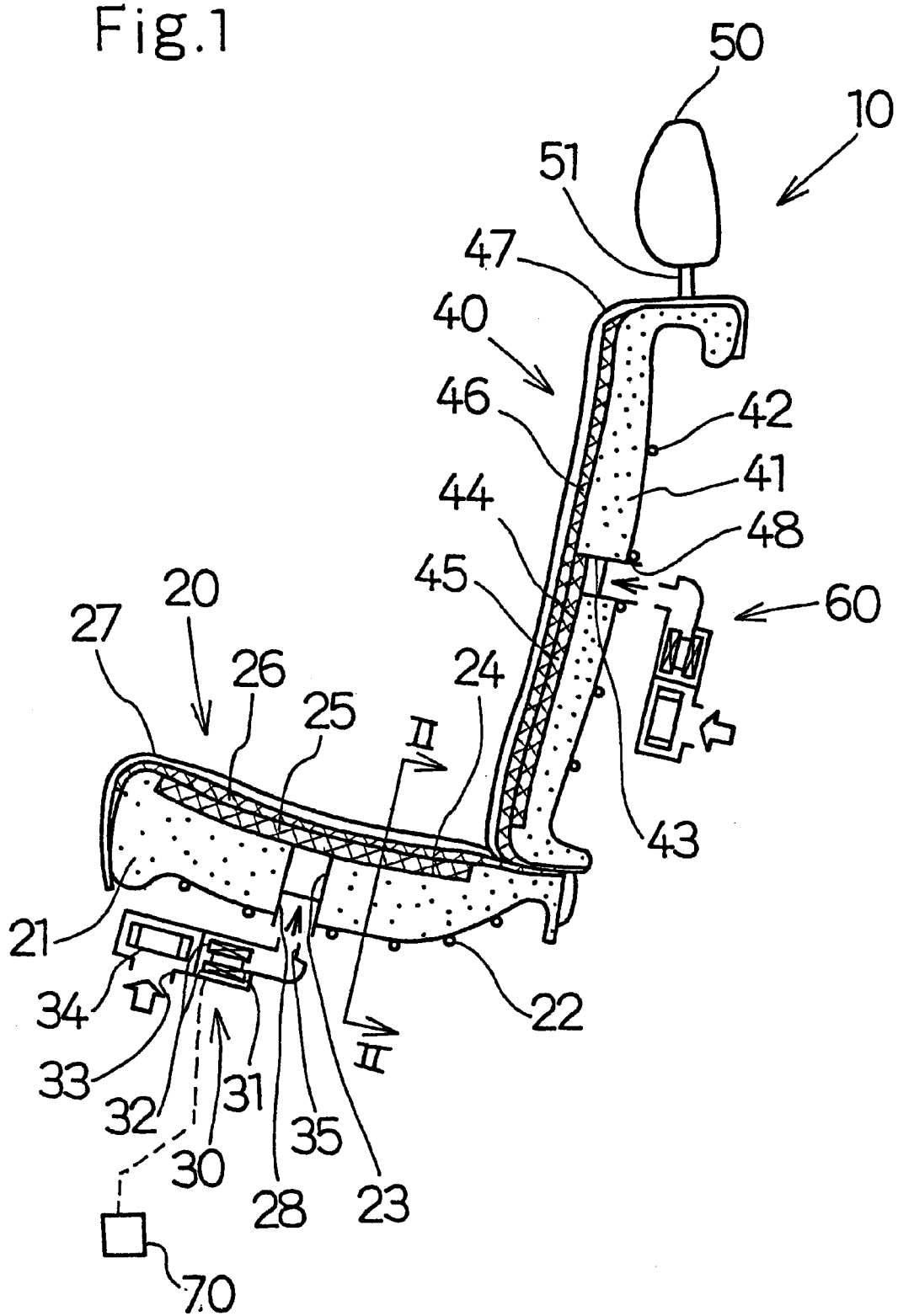
FIG. 1 is a cross-sectional view of the seat apparatus according to the present invention.

With reference initially to FIG. 1, the seat apparatus 10 of the present invention is illustrated in the context of a vehicle seat apparatus that is adapted to be connected to a vehicle floor. The seat apparatus 10 includes a seat cushion 20, a seat back 40 extending upwardly from the rear portion of the seat cushion 20, and a head rest 50 that is connected to the seat back 40 through a pair of stays 51, only one of which is shown in FIG. 1. The seat cushion 20 and the seat back 40 constitute sitting portions of the seat apparatus.

Figure 4:
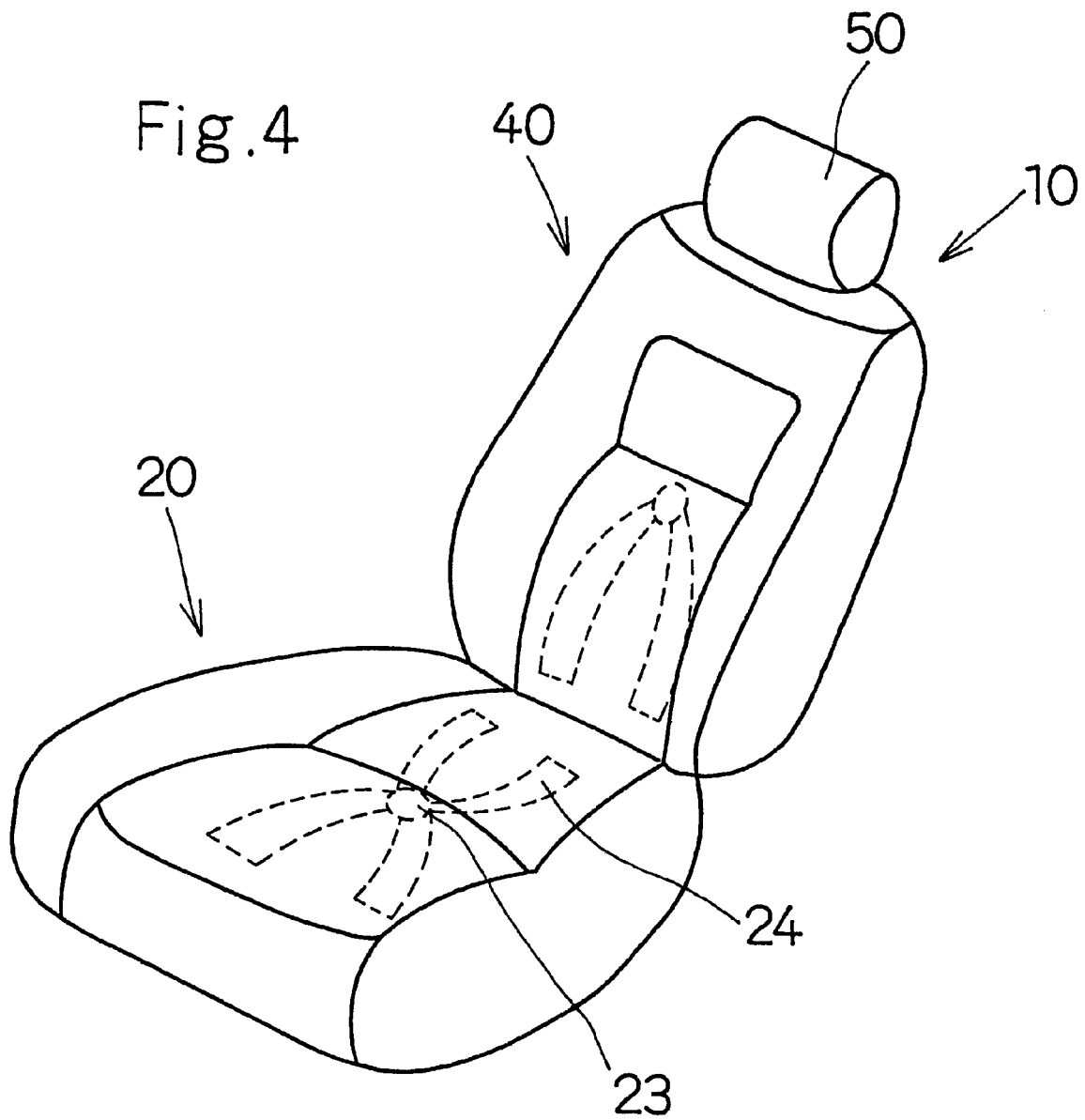
FIG. 4 is a perspective view of the seat apparatus of the present invention.

The seat cushion 20 includes a urethane member 21 constituting a filling member and S-shaped springs 22 which support the urethane member 21. The urethane member 21 has an air vent 23 that extends upwardly from the lower side of the cushion 20. In the disclosed embodiment, the air vent 23 is generally centrally located in the seat cushion 20 as seen in FIG. 4 and extends from the bottom portion of the urethane member 21 towards the upper portion of the urethane member 21. The air vent 23 thus extends from the non-sitting side of the seat cushion 20 towards sitting side of the seat cushion 20. A series of grooves 24 is formed on the upper side of the urethane member 21, with each of the grooves 24 being connected with the air vent 23. The grooves 24 are also illustrated in FIG. 4 which shows the air grooves 24 extending outwardly from the air vent 23 in several directions.

Figure 2:
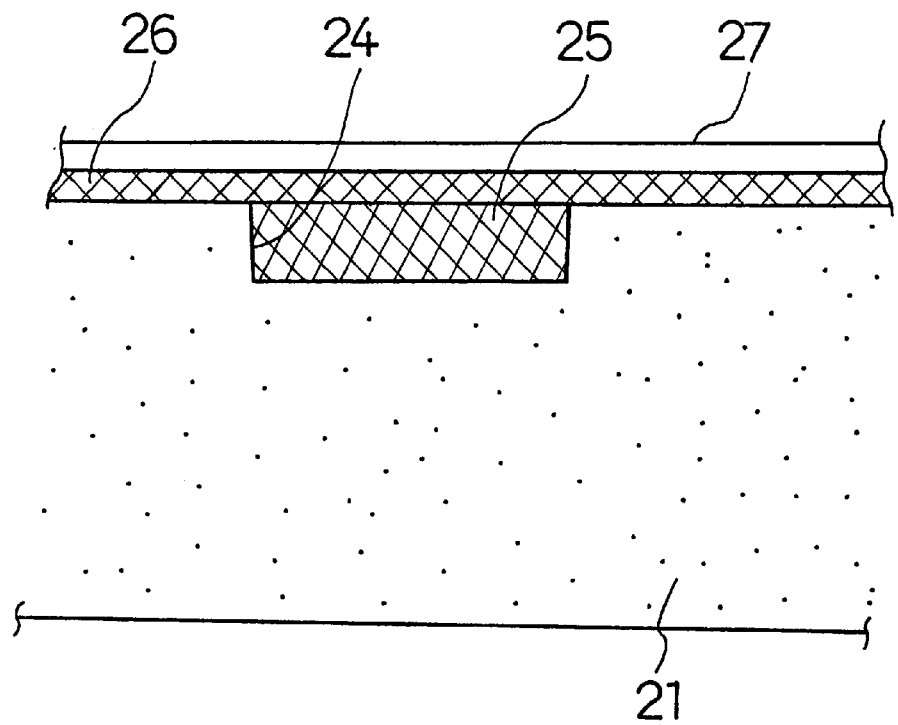
FIG. 2 is a cross-sectional view of the seat apparatus according to the present invention taken along the section line II—II in FIG. 1.

As shown in FIG. 2, a first three dimensional mesh 25 is positioned in each of the grooves 24. The three dimensional mesh 25 is known in the art as a so called three dimensional textile generally constituted by a porous body made from synthetic resin. The textile material forming the three dimensional mesh 25 is well suited to facilitating and maintaining good air flow inside the mesh 25. The mesh 25 is also preferably somewhat hard so as to be able to permit the flow of air under the weight of an individual seated on the seat apparatus. This three dimensional mesh 25 is readily available in the market, such as from UNITIKA Ltd.

Due to the provision of the three dimensional mesh 25 positioned in each of the grooves 24, even when the individual seated on the seat cushion 20 somewhat compresses the mesh 25 by his/her weight, air flow is maintained through the three dimensional mesh 25 and ventilation in the grooves 24 is not disturbed. To adequately maintain the air flow in the grooves 24, the use of a comparatively hard three dimensional mesh 25 is preferred.

A second three dimensional mesh 26 covers the first three dimensional mesh 25 as well as a portion of the urethane member 21. The second three dimensional mesh 26, and portions of the urethane member 21 are covered by a breathable fabric 27 forming a cover member. The seat cushion 20 is thus comprised of the urethane member 21, the S-shaped spring 22, the air vent 23, the grooves 24, the three dimensional meshes 25, 26, and the breathable fabric 27. The second three dimensional mesh 26 is preferably comprised of the same or similar three dimensional textile as the first mesh 25. The textile material forming the second three dimensional mesh 26 is also able to facilitate and maintain good air flow mesh 26, and is readily available from, for example, UNITIKA Ltd.

The second mesh 26 is adapted to provide comfort to the individual seated on the seat cushion 20. Therefore, a more gentle or soft (i.e., less hard) filling mesh is preferred for the second mesh 26 as compared to the first mesh 25.

A thermoelectric converter 30 is provided under the seat cushion 20. This thermoelectric converter 30 is able to control the temperature of air flowing through the thermoelectric converter 30. In this preferred embodiment, a Peltier unit or element is used in the thermoelectric converter 30. A heat exchanger 31 is attached to the Peltier element 32. The heat exchanger 31 exchanges heat between the air that is inhaled or drawn in by a fan 34 from an air intake 33 and the Peltier element 32 so as to discharge temperature controlled air from an air discharge 35. For example, during the summer season, the thermoelectric converter 30 draws in air from the air intake 33 and cools the air, through operation of the heat exchanger 31, and then discharges the cooled air through the discharge 35. The converter 30 is also able to provide heated air which is discharged to the seat cushion by way of the discharge 35 to warm an individual seated on the seat cushion 20. A power source 70 generally illustrated in FIG. 1 is connected to the air temperature control device to provide power for operation of the air temperature control device. The power source 70 can be the vehicle battery when the seat apparatus forms a vehicle seat apparatus.

The discharge 35 of the thermoelectric converter 30 is connected to an air duct 28 which is disposed in the air vent 23 of the urethane member 21. The temperature controlled air produced by the thermoelectric converter 30 is conveyed or blown to an individual sitting on the seat cushion 20 through the air duct 28, the air vent 23, the first mesh 25 positioned in the grooves 24, the second mesh 26, and the fabric 27. The air duct 28 faces towards the vehicle floor and is preferably able to slide up and down along the air vent 23 in FIG. 1. This sliding movement is designed to accommodate displacement of the seat cushion 20 without interference to the thermoelectric converter 30. This displacement of the seat cushion can occur during seat height adjustment and/or bending of the seat cushion resulting from an individual being seated on the seat cushion 20.

Figure 3:
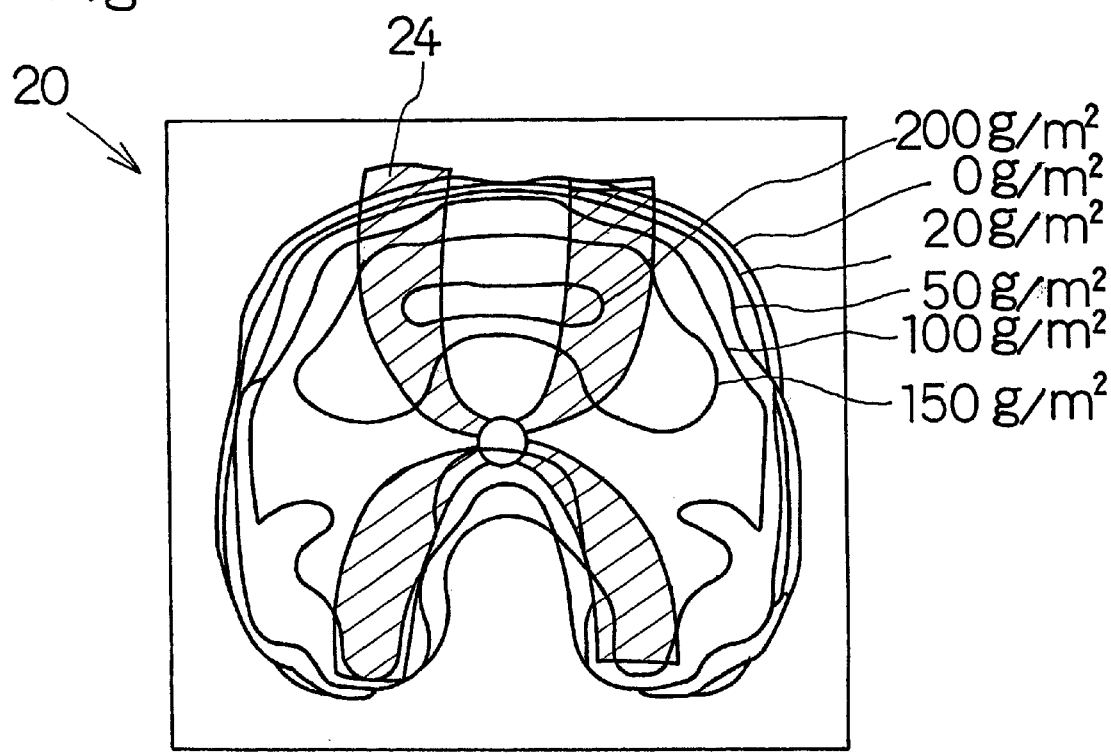
FIG. 3 is a schematic diagram illustrating the relationship between the grooves of the seat apparatus according to the present invention and the pressure distribution of the sitter's body.

As shown in FIG. 4, the grooves 24 formed in the seat cushion 20 are arranged to direct air to the portions of the seat cushion generally corresponding to the position of the individual sitting on the seat cushion 20. The grooves 24 are thus spaced apart and located in selected areas of the seat cushion 20. According to one aspect of the invention, the position of the grooves 24 is selected based on the pressure distribution associated with an individual sitting on the seat cushion 20. FIG. 3 illustrates in numerical terms the distribution of the body pressure of an individual seated on the seat cushion 20 and shows the grooves 24 being positioned in areas of relatively high body pressure. The areas of high body pressure represent the areas of the seat cushion under greater pressure from a seated individual, thus indicating areas where an individual is actually seated on the seat cushion as compared to areas adjoining the areas where the individual is seated. The reason for locating the grooves 24 in the high pressure areas is that these high pressure areas are areas that are more difficult to breathe and so the transmission of air to such areas is likely to not be very good in the absence of the grooves 24. Aside from the relative values, the specific numerical pressure distributions shown in FIG. 3 represent examples that can vary depending on the weight of the individual seated on the seat cushion. Although the positioning of the grooves 24 based on the body pressure distribution is useful, the present invention is not limited in that context.

As shown in FIG. 4, the grooves 24 extend to particular locations on the seat cushion 20. Therefore, the temperature controlled air which is introduced from the air vent 23 does not stray in an undefined general pattern on the seat cushion 20, but rather is directed along the grooves 24. As a result, temperature controlled air is advantageously directly distributed to the individual sitting on the seat cushion 20 in an efficient manner.

As seen with reference once again to FIG. 1, the seat back 40 includes a urethane member 21 that is provided with an air vent 43 which accommodates an air duct 48. The urethane member 41 is outfitted with several grooves 44 that are connected to the air vent 43. FIG. 4 illustrates the grooves 44 in the urethane member 41 and the way in which the grooves 44 are connected to the air vent 43. As shown in FIG. 4, the grooves 44 extend outwardly from the air vent 43 in several directions (e.g., generally downwardly).

The urethane member 41 is supported by S-shaped springs 42. A thermoelectric converter 60 is disposed on the rear side of the seat back 40 (i.e., the side of the seat back opposite the side upon which an individual's back rests during sitting) to introduce temperature controlled air to the air duct 48.

A first three dimensional mesh 45 is located in each of the grooves 44. The three dimensional mesh 45 and the urethane member 41 are covered by a second three dimensional mesh 46. In addition, a breathable fabric 47 covers the second mesh 46 and portions of the urethane member 41. The seat back 40 is thus comprised of the fabric 47, urethane member 41, the S-shaped springs 42, the air vent 43, the grooves 44, and the three dimensional meshes 45, 46.

As shown in FIG. 4, the grooves 44 possess a shape and are positioned in the seat back in a manner designed to distribute the temperature controlled air to locations where the individual's back is located when in the seated position. The operation of the seat back 40 from the standpoint of producing temperature controlled air and distributing the temperature controlled air is substantially the same as that described above in connection with the seat cushion 20 and so such description will not be repeated here.

In the preferred embodiment of the present invention, two independent thermoelectric converters 30, 60 are used for the seat cushion 20 and the seat back 40, respectively. However, a single thermoelectric converter may be used for both the seat cushion 20 and the seat back 40.

In accordance with the present invention, the provision of the grooves 24, 44 which distribute the temperature controlled air on the seat cushion 20 and the seat back 40 advantageously directs the temperature controlled air to the desired positions of the seat apparatus 10 at which the individual sitting on the seat is positioned to thereby increase the comfort of the seated individual.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A seat apparatus for directing temperature controlled air to an individual seated on the seat apparatus, comprising:

a sitting portion contacted by a seated individual seated on the sitting portion, the sitting portion including a filling member, the sitting portion possessing a sitting side facing an individual seated in the sitting portion and an oppositely positioned non-sitting side, said filling member including at least one groove extending over a limited surface area of the filling member on the sitting side, and a material positioned in the at least one groove that is different from the filling member;

a cover member encircling the filling member;

an air vent provided in the filling member and extending from adjacent the non-sitting side of the sitting portion towards the sitting side of the sitting portion, said air vent communicating with the at least one groove;

a temperature controlled air producing device for producing temperature controlled air and directing the temperature controlled air into the air vent, with the temperature controlled air being directed through the air vent and into the at least one groove to provide temperature controlled air to a seated individual in contact with the sitting side of the sitting portion.

2. A seat apparatus according to claim 1, wherein the sitting portion is a seat back.

3. A seat apparatus according to claim 1, wherein the sitting portion is a seat cushion.

4. A seat apparatus according to claim 3, including a seat back that is comprised of a filling member provided with at least one groove, the filling member of the seat back including an air vent that communicates with the at least one groove in the filling member of the seat back, the filling member of the seat back being covered by a cover member.

5. A seat apparatus according to claim 4, including a temperature controlled air producing device connected to the air vent in the filling member of the seat back for producing temperature controlled air and directing the temperature controlled air into the air vent in the filling member of the seat back, with the temperature controlled air being directed to the at least one groove in the filling member of the seat back to provide temperature controlled air to a seated individual in contact with the seat back.

6. A seat apparatus according to claim 1, wherein said filling member includes a plurality of spaced apart grooves, each connected to the air vent.

7. A seat apparatus according to claim 1, wherein said material in the at least one groove is a first mesh material.

8. A seat apparatus according to claim 7, including a second mesh material covering the first mesh material and a portion of the filling member.

9. A seat apparatus for blowing air to an individual seated on the seat apparatus, comprising:

a sitting portion which is contacted by a seated individual, the sitting portion having a sitting side and a non-sitting side, said sitting portion including a filling member;

an air vent extending from adjacent the non-sitting side of the sitting portion towards the sitting side of the sitting portion;

a plurality of grooves formed in the filling member and each connected to the air vent, said plurality of grooves being spaced apart from one another and extending in different directions;

a material positioned in at least one of said grooves that is different from said filling member; and an air control device operatively connected to the air vent for blowing air into the air vent, with the air being directed from the air vent into the grooves so that air is directed at the seated individual.

10. An apparatus according to claim 9, wherein the sitting portion is a seat cushion.

11. An apparatus according to claim 9, wherein the sitting portion is a seat back.

12. An apparatus according to claim 9, including a power supply for supplying electric power to the air temperature control device.

13. A seat apparatus according to claim 9, including a three dimensional mesh covering the sitting portion.

14. A seat apparatus according to claim 9, wherein said at least one groove is filled with a three dimensional mesh.

15. A method of blowing temperature controlled air to an individual seated on a sitting portion of a seat apparatus, comprising:

producing temperature controlled air;

supplying the temperature controlled air to an air vent that is connected to a plurality of mesh filled grooves which extend in different directions; and distributing the temperature controlled air through the plurality of grooves and through the mesh to selected portions of the sitting portion of the seat apparatus based on a pressure distribution of the individual sitting on the sitting portion of the seat apparatus.

\* \* \* \* \*